(12) United States Patent
Gorshtein et al.

(10) Patent No.: US 6,668,316 B1
(45) Date of Patent: Dec. 23, 2003

(54) METHOD AND APPARATUS FOR CONFLICT-FREE EXECUTION OF INTEGER AND FLOATING-POINT OPERATIONS WITH A COMMON REGISTER FILE

(75) Inventors: Valery Y. Gorshtein, Moscow (RU); Olga A. Efremova, Moscow (RU)

(73) Assignee: Elbrus International Limited (KY)

( * ) Notice: Subject to any disclaimer, the term of this patent is extended or adjusted under 35 U.S.C. 154(b) by 0 days.

(21) Appl. No.: 09/504,966

(22) Filed: Feb. 15, 2000

Related U.S. Application Data

(60) Provisional application No. 60/120,446, filed on Feb. 17, 1999.

(51) Int. Cl.[7] .................................................. G06F 15/00
(52) U.S. Cl. .................................................. 712/221
(58) Field of Search ........................... 712/14, 23, 221, 712/218, 33, 222, 22

(56) References Cited

U.S. PATENT DOCUMENTS

| | | | | |
|---|---|---|---|---|
| 4,725,973 A | * | 2/1988 | Matsuura et al. | 708/520 |
| 5,233,694 A | * | 8/1993 | Hotta et al. | 700/7 |
| 5,481,736 A | * | 1/1996 | Schwartz et al. | 708/316 |
| 5,488,729 A | * | 1/1996 | Vegesna et al. | 712/209 |
| 5,560,035 A | | 9/1996 | Garg et al. | 395/800 |
| 5,692,139 A | | 11/1997 | Slavenburg et al. | 395/311 |
| 5,838,986 A | | 11/1998 | Garg et al. | 395/800 |
| 5,890,009 A | | 3/1999 | Luick et al. | 395/800.24 |
| 5,923,871 A | | 7/1999 | Gorshtein et al. | 395/562 |
| 6,163,837 A | | 12/2000 | Chan et al. | 712/216 |

OTHER PUBLICATIONS

Micosoft Company. Microsoft® Computer Dictionary Fourth Edition. Microsoft Press, ©1999. Pp. 56.*
Diefendorff, K. "The Russians are Coming Supercomputer Make Elbrus Seeks to Joinx86/LA–64 Melee", *Microprocessor Report*, 13 (2): 1–7, 1999.

* cited by examiner

Primary Examiner—Richard L. Ellis
Assistant Examiner—Aimee J. Li
(74) Attorney, Agent, or Firm—Townsend and Townsend and Crew LLP

(57) ABSTRACT

In a wide instruction architecture processor device, an instruction execution unit provides integer and floating point capability within its constituent arithmetic logic channels. Results are written out to a register file where integer results are given higher priority over floating point results, which are buffered, in order to increase integer operation throughput. By buffering floating point results and giving priority to integer results, fewer register file write ports are needed. A bypass mechanism allows access to floating point results during their pendency in the buffer. Dual serially-configured integer units are configured to enable two-operand and combined (three-operand) instructions to be delivered to an arithmetic and logic channel at every clock cycle. Similarly, dual parallel pipelined floating point units are configured to permit two-operand and combined (three-operand) floating point instructions to be delivered to an arithmetic and logic channel on each clock cycle.

12 Claims, 17 Drawing Sheets

METHOD AND APPARATUS FOR CONFLICT-FREE EXECUTION OF INTEGER AND FLOATING-POINT OPERATIONS WITH A COMMON REGISTER FILE

CROSS-REFERENCES TO RELATED APPLICATIONS

This application claims the benefit of U.S. Provisional Application No. 60/120,446, filed Feb. 17, 1999, and is herein incorporated for all purposes.

BACKGROUND OF THE INVENTION

The present invention relates to processing devices in general, and more particularly to processing devices whose designs are based on a very long instruction word (VLIW) architecture. More specifically, the present invention relates to register file access in a VLIW-based machine.

In response to the continuing demand for increased processing speed, designers have developed central processing unit (CPU) architectures in which a single CPU has characteristics of a conventional uni-processor and a parallel machine. A single instruction register and instruction sequence unit execute programs under a single flow of control. However, arithmetic and logic channels (ALC's) within the CPU perform multiple primitive operations (i.e., simple arithmetic, logic, or data transfer operations) simultaneously. An ALC provides integer computations and logic operations.

A compiler analyses the source code of a program and identifies all the simultaneous operations that can be performed. The compiler produces assembly code comprising instructions having multiple operations to effect multiple parallel operations. Since the instruction word held in the instruction register must specify multiple independent operations, each to be performed by a different ALC, this approach employs a very long instruction word (VLIW) instruction format. For this reason, such CPU designs are commonly known as a VLIW architecture.

The memory of a VLIW machine is commonly referred to as a register file. A register file provides functionality similar to conventional general purpose registers, namely, temporary storage for intermediate results during arithmetic computations, loop execution, branching handling, and so forth. Ideally, there is a single register file. A single register file provides a straightforward memory model, thus simplifying the design of the processor.

Conventional VLIW architectures, however, are faced with the reality that such an approach is not practically feasible. One reason is that the very high number of read and write ports needed to implement a single register file design increases data access times exponentially. Secondly, circuit design rule limits are quickly reached because of the great numbers data lines that must be brought to the one register file. Performance and design rule limits, therefore, impose a limit on the number of ports for any given size register file and any given number of ALC's.

Consequently, VLIW architectures are typically provided with multiple register files. For example, one register file may be provided for integer results and another register file for floating point results. Performance is slightly degraded, however, in situations involving integer-to-floating point conversion and vice-versa. The operation requires movement of data between the two register files, a time consuming operation. Some VLIW architectures use a special "roll-out" floating point register file. This adds further complexity to an already complex hardware design.

What is needed is a computer architecture which can address the foregoing shortcomings of conventionally designed VLIW-based central processing units. There is a need for a design which allows more efficient use of register files given the fact that data lines for read and write operations are limited. It is desirable to provide apparatus and methods which can realize increased access to register files in a wide instruction format central processing unit. It is further desirable to provide apparatus and methods for increased access to register files with respect to integer instructions and floating point instructions.

SUMMARY OF THE INVENTION

In a wide instruction architecture processor device, an instruction execution unit provides integer and floating point capability within its constituent arithmetic logic channels. Results are written out to a register file where integer results are given higher priority over floating point results, which are buffered, in order to increase integer operation throughput. By buffering floating point results and giving priority to integer results, fewer register file write ports are needed. A bypass mechanism allows access to floating point results during their pendency in the buffer. Dual serially-configured integer units are configured to enable two-operand and combined (three-operand) instructions to be delivered to an arithmetic and logic channel at every clock cycle. Similarly, dual parallel pipelined floating point units are configured to permit two-operand and combined (three-operand) floating point instructions to be delivered to an arithmetic and logic channel on each clock cycle.

A processing unit device in accordance with the invention includes an instruction having a plurality of arithmetic logic channels (ALC's). A register file in data communication with the instruction execution unit is provided with plural read ports and write ports. Each ALC includes a single ALC output coupled to a write port of the register file. First and second computation units are provided. Input selector circuitry selectively delivers data from read ports of the register file to the first and second computation units. An output selector selectively couples the outputs of the first and second computation units.

Control logic is provided to detect an output conflict wherein the first and second computation units produce results that are ready to be written to the register file. The control logic is configured to deliver one of the results to the ALC output. The control logic is further configured to deliver the other result to a buffer.

A bypass bus couples the ALC's together. Results produced by an ALC can be delivered directly to another ALC for subsequent operations. The bypass obviates the step of writing results to the register file, only to be read back by an ALC in the next machine cycle.

In an embodiment of the invention the first computation unit is integer computation logic and the second computation unit is floating point computation logic. In a further embodiment of the invention, the integer computation logic comprises dual integer units configured in a serial manner to provide two-operand and combined integer operations. The floating point computation unit comprises dual floating point units configured to provide two-operand and combined floating point operations.

Further in accordance with the invention, an arithmetic and logic channel includes first and second integer units. An output of the first integer unit is in data communication with an input of the second integer unit. Input selection circuitry selectively couples data from the read ports of the register file to the inputs of the first integer unit and to the second input of the second integer unit. This arrangement permits integer instructions to begin execution at each clock cycle.

The arithmetic and logic channel further includes first and second floating point units. The floating point units are configured for parallel, independent operation. The input selection circuitry is provided with a buffer which can selectively receive data from the read ports of the register file. Outputs of the floating point unit are coupled to the input selection circuitry. The input selection circuitry is configured to coupled data from the read ports, data from the buffer, and the floating point outputs to the inputs of the floating point units. This arrangement provides floating point instructions of the two-operand and three-operand variety to begin execution at every clock cycle.

In accordance with the invention, a method of operating an arithmetic and logic unit includes delivering first and second operands to a first computation unit. Similarly, third and fourth operands are delivered to a second computation unit. Upon detecting a conflict condition wherein a first result from said first computation unit and a second result from said second computation unit are produced in a the same clock cycle, the first result is buffered. The second result is delivered to an output port. In a subsequent clock cycle, the first result is delivered to the output port from the buffer.

Further in accordance with the invention, a method of operating an arithmetic logic unit includes delivering first and second operands to a first integer unit in a first clock cycle to produce a first result. In a second clock cycle, producing the first result and delivering it to a second integer unit. Also in the second clock cycle, delivering a third operand to the second integer unit and delivering fourth and fifth operands to the first integer unit. This arrangement enables two-operand and three-operand instructions to begin at every clock cycle.

DESCRIPTION OF THE SPECIFIC EMBODIMENTS

Figure 1:
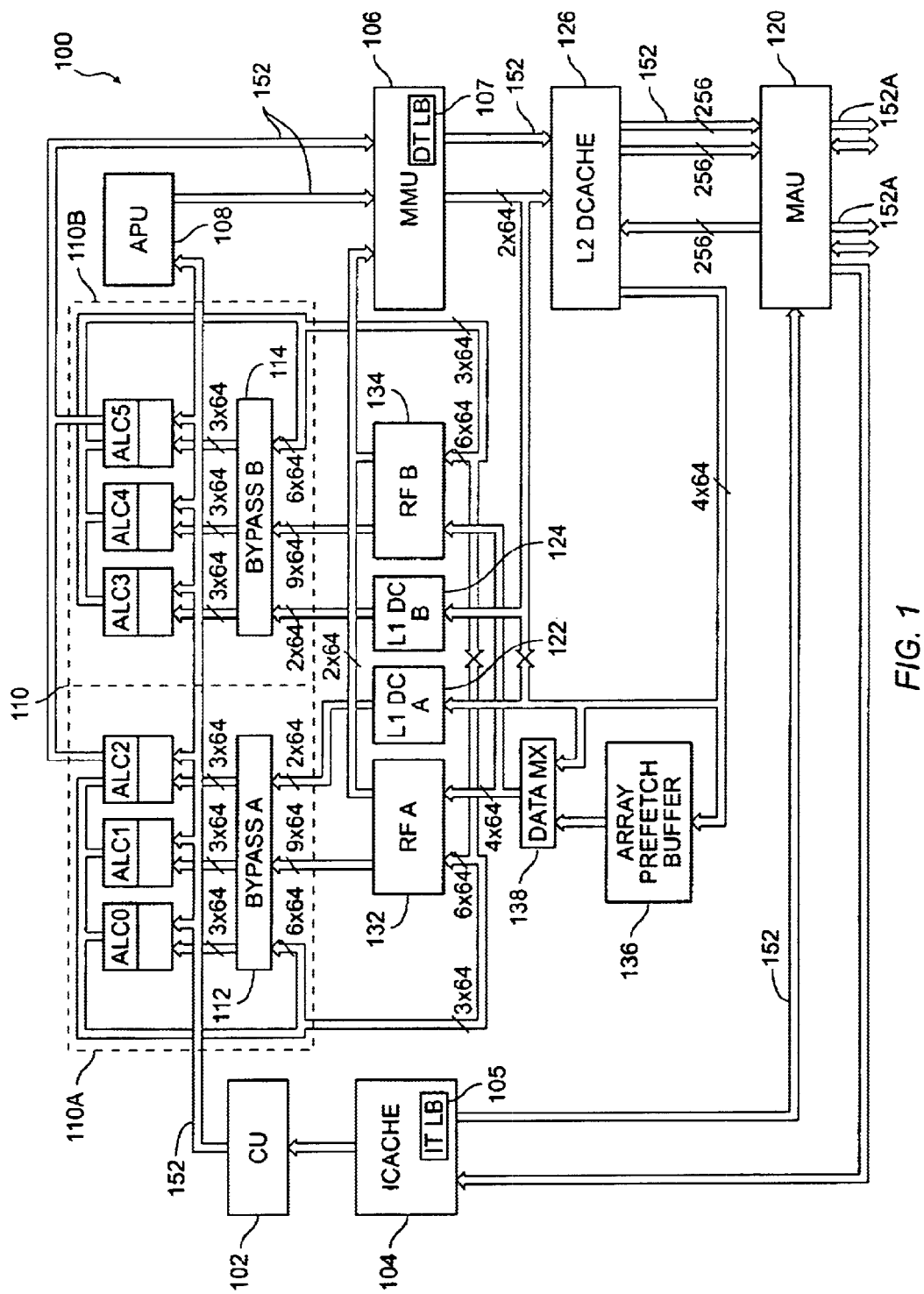
FIG. 1 is a simplified system diagram of a central processing unit of the present invention.

FIG. 1 is a highly simplified block diagram of a central processing unit (CPU) for a wide instruction architecture computer. Various supporting logic, control lines, and data lines, understood to be present, are not shown for clarity. The block diagram of FIG. 1 provides a contextual backdrop for a discussion of the instruction execution unit 110.

A central processor unit (CPU) 100 in accordance with an embodiment of the present invention uses a wide instruction word architecture and instruction level parallelism (ILP) to ensure high performance. A compiler written for this CPU can plan CPU work on a cycle-by-cycle basis. The processor structure allows concurrent execution of a few simple independent instructions (operations) that constitute the wide instruction format supported by the CPU. Instructions supported by the present invention include load, store, add, multiply, divide, shift, logical, and branch.

Wide instructions are stored in a system memory (not shown) and buffered into an instruction cache (ICACHE) 104 of CPU 100. It is conventionally known to one of ordinary skill in the relevant arts that the instruction cache can include an Instruction Translate Lookaside Buffer (IT LB) 105. The wide instructions are stored in a packed format as sets of 16- and 32-bit syllables. Each syllable is a fixed 32-bit datum and comprises an 8-bit opcode and three 8-bit register addresses. In this respect, syllables are similar to conventional machine code instructions having an opcode and one or more associated operands. Particular operations can occupy a part of syllable, a whole syllable or can span several syllables.

The CPU 100 further includes a control Unit (CU) 102. There are two blocks of multi-ported register files (RF A) 132 and (RF B) 134. Each register file 132, 134 has an associated level 1 data cache (L1 DC A) 122 and (L1 DC B) 124. The dual multi-ported register files 132, 134 and their corresponding L1 caches 122, 124 are used to decrease the number of access ports per register file. The register files and the L1 caches contain equal data. Thus, each register file is of the same size. The data contained in one register file is mirrored in the other. Similarly, each L1 cache is of the same size, and the data in one is mirrored in the other. In one embodiment of the invention, each register file contains 256 64-bit words.

The register files serve as sources of operands to the ALC's based on control signals produced by control unit 102 in accordance with the operands specified in the syllables of a decoded wide instruction. The register file also serves as recipient of results from computations made by the ALC's. Each register file is provisioned with 9 read ports and 10 write ports. All 9 read ports are used to deliver operands to the ALC's. Two of the read ports are used to deliver stored values to MMU 106. Six of the write ports are used to store ALC results. The remaining 4 write ports of the register file are used to write values loaded from memory.

An instruction execution unit 110 comprises six arithmetic logic channels (ALC0–ALC5), configured as dual execution units 110A, 110B. The arithmetic logic channels (ALC's) are parallel executive channels. Each ALC provides substantially the same set of arithmetic and logic operations. A pair of bypass buses collectively shown as 112 and 114 serve to abate the time of delivery of data among the ALC's. As will be discussed, all ALC's receive their operands from register files 132, 134 and via bypass buses 112, 114. The results of ALC operations are written to the register files through their respective write ports.

The CPU further includes an array pre-fetch buffer (APB) 136. Array pre-fetch buffer 136 is used to store array elements from memory for loop execution and feeds data to the register files 132, 134 via the DATA MX 138. An array pre-fetch unit (APU) 108 is also provided to facilitate loop execution in an array by creating and storing array element addresses during loop execution.

The CPU further includes a memory management unit (MMU 106. The memory management unit contains a data translate lookaside buffer (DTLB) 107 for address translations, such as in a virtual memory environment. The MMU performs hardware searches in a Page Table (not shown) in the case of DTLB miss. To speed up data access an L2 data cache 126 is provided to cache data for scalar memory access. A memory access unit (MAU) 120 contains an entry buffer for memory requests.

The instruction cache 104 includes a buffer which stores a wide instruction in packed form as it is stored in system memory (not shown). The instruction cache delivers an instruction to the control unit 102. The control unit generates an unpacked form of a received wide instruction. The control unit transforms indirect based operand addresses contained in the syllables of a wide instruction into absolute register file addresses. The control unit also checks the conditions of the wide instruction issue. The wide instruction issue conditions which are checked include: checking for no exceptions, checking for no interlock conditions from the other units of CPU 100, and checking for the availability of operands in the register files 132, 134. The control unit 102 issues wide instruction operations for execution by the instruction execution unit 110 by producing appropriate control signals. For example, control signals are produced to issue operations to the ALC's (ALC0–ALC5). There are control signals to read operands from the register files 132, 134 for delivery to the appropriate ALC's. Control signals are also produced for issuing literal values to the ALC's.

Address buses 152 run throughout the design. The bus width depends on the maximum size of the system memory contemplated for the design. In one embodiment, for example, the system physical memory is 1024 gigabytes (GB, or 1 terabyte, TB), requiring physical memory address buses 152A to be 40 bits wide. A virtual memory size of 256 TB, requiring system address buses 152 to have a width of 48 bits. Data buses are also provided, interconnecting the various sub-systems. These buses are designated by their bus widths. For example, the data bus connecting the memory access unit 110 to the instruction cache 104 is a 256-bit data bus.

Figure 2:
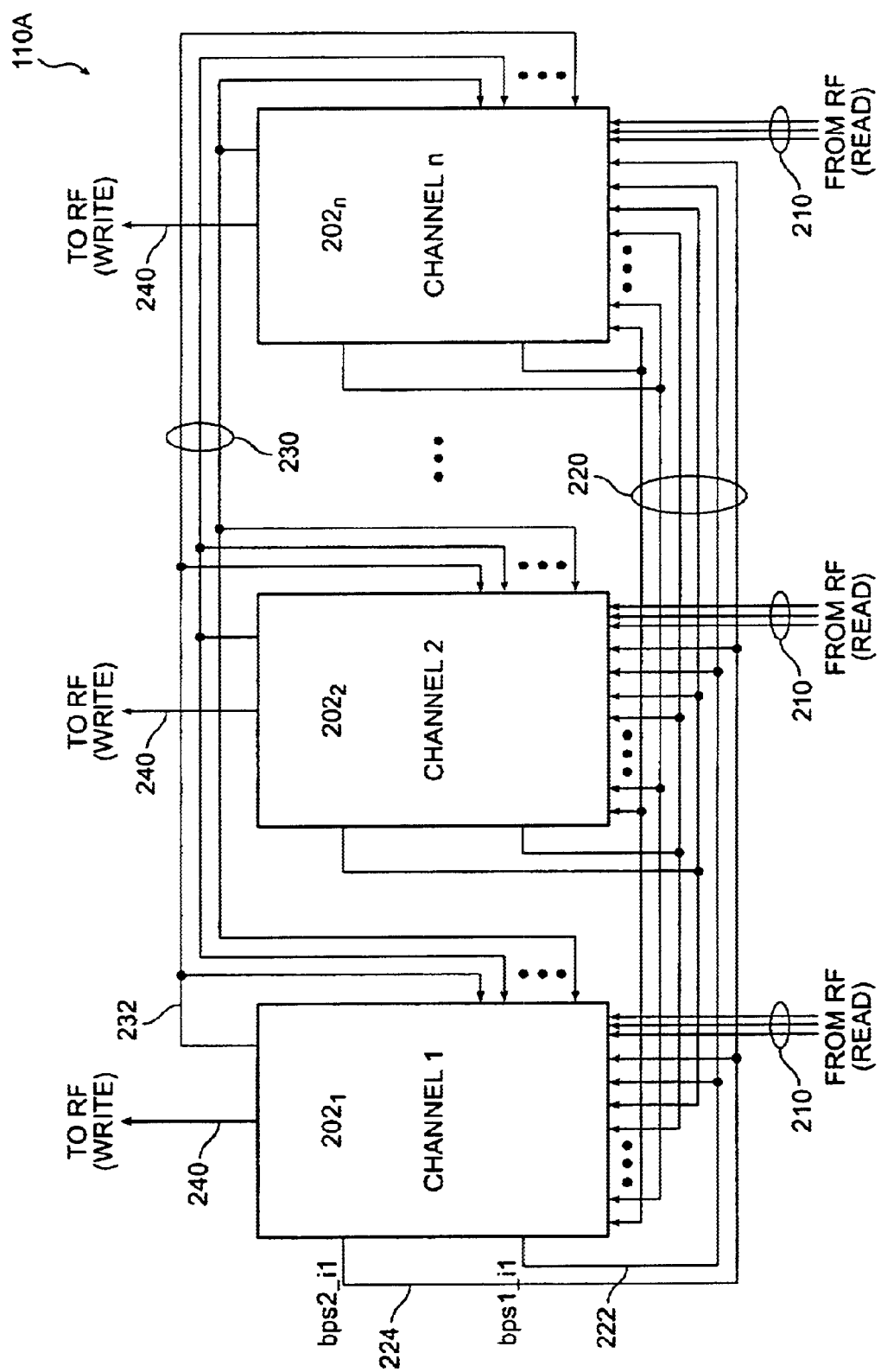
FIG. 2 shows a block diagram highlighting the features of the instruction execution unit in accordance with the invention.

Referring now to FIG. 2, a simplified block diagram of instruction execution unit 110 highlights the features of the present invention. Supporting logic and additional control lines and data lines understood to be present have been omitted for clarity. Execution unit 110A will be described with the understanding that the discussion applies equally to execution unit 110B.

Instruction execution unit 110A comprises three ALC's (ALC0–ALC2) and an associated register file 134. It is understood that in general there can be N ALC's $202_1$–$202_N$.

Each ALC $202_x$ provides integer arithmetic and floating point arithmetic operations. Each ALC is coupled to register file 132 by a single write port 240 for writing data out to the register file. Register file 132 is provided with a write port for each ALC to which it is coupled. Each ALC is further coupled to the register file by way of three read ports 210 for supplying operands to the ALC. The register file is provided with three read ports for each ALC to which it is coupled.

The three read ports 210 provide up to three operands to an ALC from the register file. The actual number of operands provided depends on the particular operation being executed. Monadic operations such as a logical left shift call for a single operand, namely, the datum which is the subject of the operation. For 2-operand instructions, two of the three read ports 210 will be activated to deliver two operands to the ALC. Combined operations require three operands. For example, the operation ADD r1, r2, r3 produces the sum of the three registers which is then stored in r3. In the case of combined operations, each of the three read ports 210 will deliver an operand to the ALC.

As shown in FIG. 1, the ALC's comprising execution unit 110A are interconnected by bypass bus 112. Similarly, the ALC's comprising execution unit 110B are interconnected by bypass bus 114. FIG. 2 shows that bypass bus 112 comprises an integer bypass bus 220 and a floating point bypass bus 230. Each of the N ALC's $202_1$–$202_N$ includes a pair of integer bypass lines 222, 224 and a single floating point bypass line 232. The integer bypass lines of all of the ALC's together constitute the integer bypass bus 220. Likewise, the floating point bypass lines of all the ALC's together constitute the floating point bypass bus 230. Each of the 2N integer bypass lines 222, 224 comprising the integer bypass bus 220 feeds into inputs of each ALC 202. Likewise, each of the N floating point bypass lines comprising the floating point bypass bus feeds into inputs of each ALC.

Figure 3:
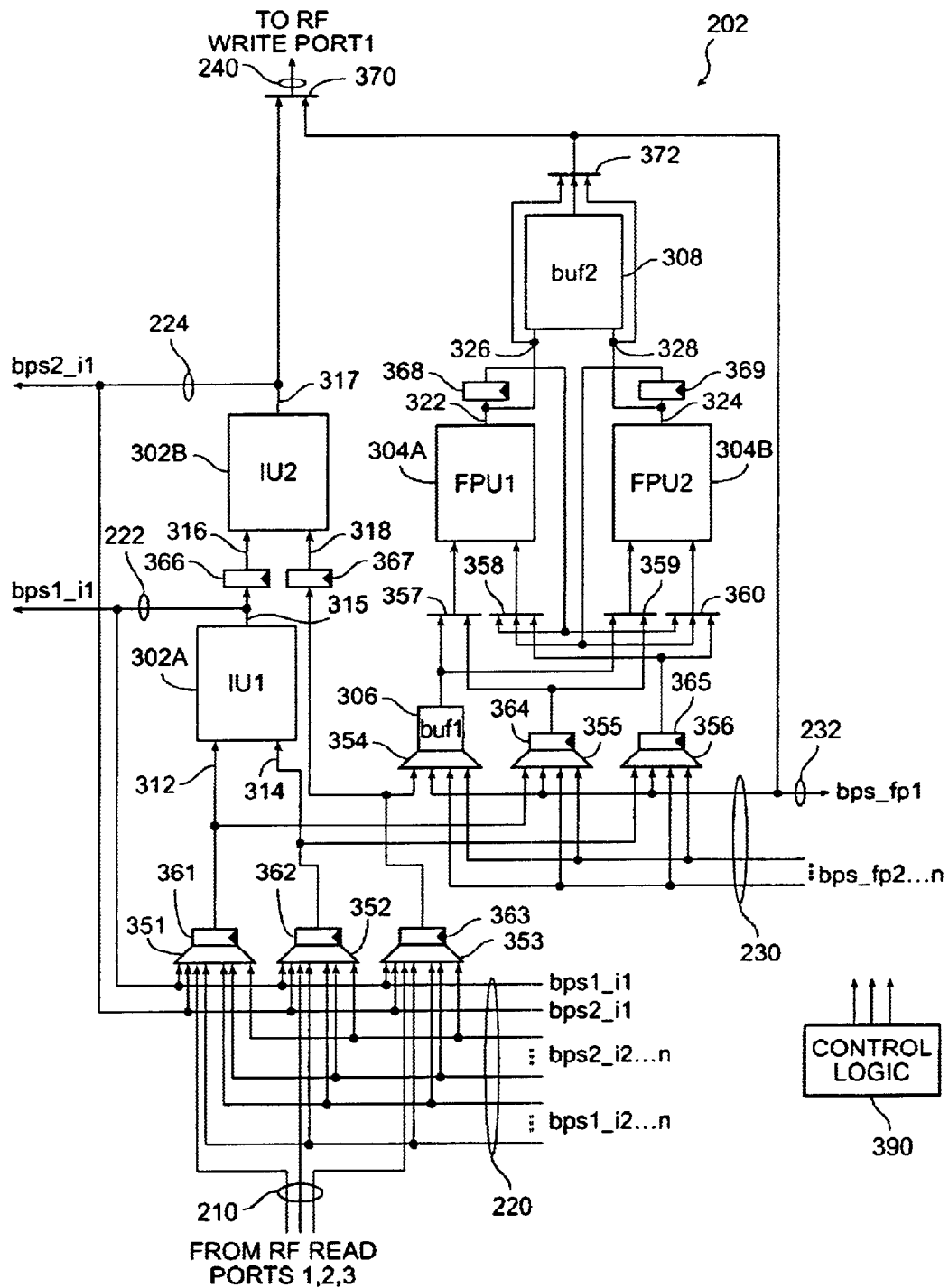
FIG. 3 is a block diagram highlighting the features of an arithmetic logic channel of the present invention.

FIG. 3 shows a simplified block diagram of one of the ALC's 202. The supporting logic and various control lines and data lines have been omitted for clarity.

On the input side of ALC 202, there is a bank of three multiplexers (mux's) 351, 352, 353. Each of muxes 351–353, is a 2N+1 to 1 selector. The inputs of each mux receive the pair of integer bypass lines 222, 224 from each of the N ALC's. Each mux also receives one of the three read ports 210 from register file 132 (134) Hence each mux 351–353 is provided with at least 2N+1 inputs. It is further noted that each mux "input" is n-bits wide, where n represents the width of the data bus. For example, in a preferred embodiment of the invention, the data bus is 64 bits wide. Thus, each input on the input-side of a mux is a 64-bit data bus. Likewise, the output of a mux is a 64-bit data bus. Each mux 351–353 includes a selector control input to select from among the 2N+1 inputs.

The output of each mux 351–353 is coupled to an associated register 361–363. In particular, the output of mux 351 is coupled to register 361, the output of mux 352 is coupled to register 362, and mux 353 is coupled to register 363. Registers 361–363 ensure synchronous flow of data within ALC 202. The registers are clocked by a CPU clock (not shown) to ensure that the various data flows are properly timed.

A first integer computation unit (IU1) 302A has two inputs 312, 314. Register 361 is coupled to input 312. Similarly, register 362 is coupled to input 314. Integer unit 302A performs conventional integer arithmetic operations. The result of the integer computation is provided at an output 315 of the integer unit. The output 315 is coupled to integer bypass line 222 of the ALC. As can be seen, integer bypass line 222 feeds into integer bypass bus 220.

Two registers 366 and 367 are provided. Output 315 of integer unit 302A feeds into register 366. Register 367 is coupled to the output of register 363. Registers 366 and 367 are clocked by the system clock to provide synchronous operation within the ALC.

In accordance with the invention, a second integer computation unit (IU2) 302B is provided. Integer unit 302B has two inputs 316 and 318. The outputs of registers 366 and 367 deliver data to inputs 316 and 318 respectively. Integer unit 302B, like integer unit 302A, provides conventional integer arithmetic computations. Results of the integer arithmetic are produced at an output 317 of the integer unit 302B. Output 317 is coupled to integer bypass line 224. As can be seen, integer bypass line 224 feeds into integer bypass bus 220. Output 317 is further coupled to an input of selector 370. An output of selector 370 is coupled to a write port 240 of the register file.

Returning to the input side of ALC 202, there is another bank of three muxes 354–356. Each mux 354–356 is an N+1 to 1 selector. Each of the N floating point bypass lines 232 of ALC's $202_1$–$202_N$ is coupled to an input of each mux. In addition, an input of mux 354 receives an output from register 363. An input of mux 355 receives an output of register 361. An input of mux 356 receives an output of register 362. Hence each mux 354–356 is provided with at least N+1 inputs. As with mux's 351–353, the inputs and outputs of mux's 354–356 are 64 bits wide.

The outputs of mux's 355 and 356 each is coupled to a register 364 and 365 respectively. These registers are clocked by the system clock to synchronize the data flow within the ALC. The output of mux 354 is coupled to a first buffer memory (buf1) 306. The first buffer memory is a first-in-first-out queue. As will be discussed below, buffer memory 306 is used during floating point combined operations.

Four selectors 357–360 are provided. Buffer memory 306 feeds into selectors 357 and 359. Likewise, the output of register 364 feeds into selectors 357 and 359. The output of register 365 is coupled to selectors 358 and 360.

Further in accordance with the present invention, two floating point computation units (FPU1, FPU2) 340A, 304B are provided. The floating point units use a pipelined architecture and provide conventional floating point operations. In addition, as will be discussed further below, the floating point units are configured to provide parallel, independent execution. The outputs of selectors 357 and 358 are coupled to inputs of floating point unit 304A. The outputs of selectors 359 and 360 are coupled to inputs of floating point unit 304B.

A second buffer memory (buf2) 308 is provided. More particularly, buffer memory 308 is a first-in-first-out queue. The buffer memory has two inputs 326 and 328. An output of the buffer memory feeds into an input of a selector 372. The output of selector 372 is delivered to another input of selector 370 and to floating point bypass line 232. As can be seen, floating point bypass line feeds into floating point bypass bus 230.

Floating point computation unit 304A produces an output 322. The output 322 feeds into a register 368. As with the other registers, register 368 is clocked by the system clock to ensure synchronous operation. An output of register 368 feeds back to inputs of selectors 358 and 360. The output 322 of floating point unit 304A is further coupled to input 326 of buffer memory 308 and to another input of a selector 372.

Floating point computation unit 304B produces an output 324. The output 324 feeds into a register 369. As with the other registers, register 369 is clocked by the system clock to ensure synchronous operation. An output of register 369 feeds back to inputs of selectors 358 and 360. The output 324 of floating point unit 304B is further coupled to input 328 of buffer memory 308 and to another input of a selector 372.

There is control logic 390 which detects various states of execution in the ALC. The control logic produces various control signals to cause the foregoing logic to operate in accordance with the present invention as will be discussed next. For example, the control logic issues control signals to activate the floating point units. Control signals are provided to operate the various muxes. Control signals are provided to control the ordering of results in buffer memory 308 as it receives results from the floating point units. Control signals are provided to synchronized the delivery of data into the integer and floating point bypass lines.

Figure 4:
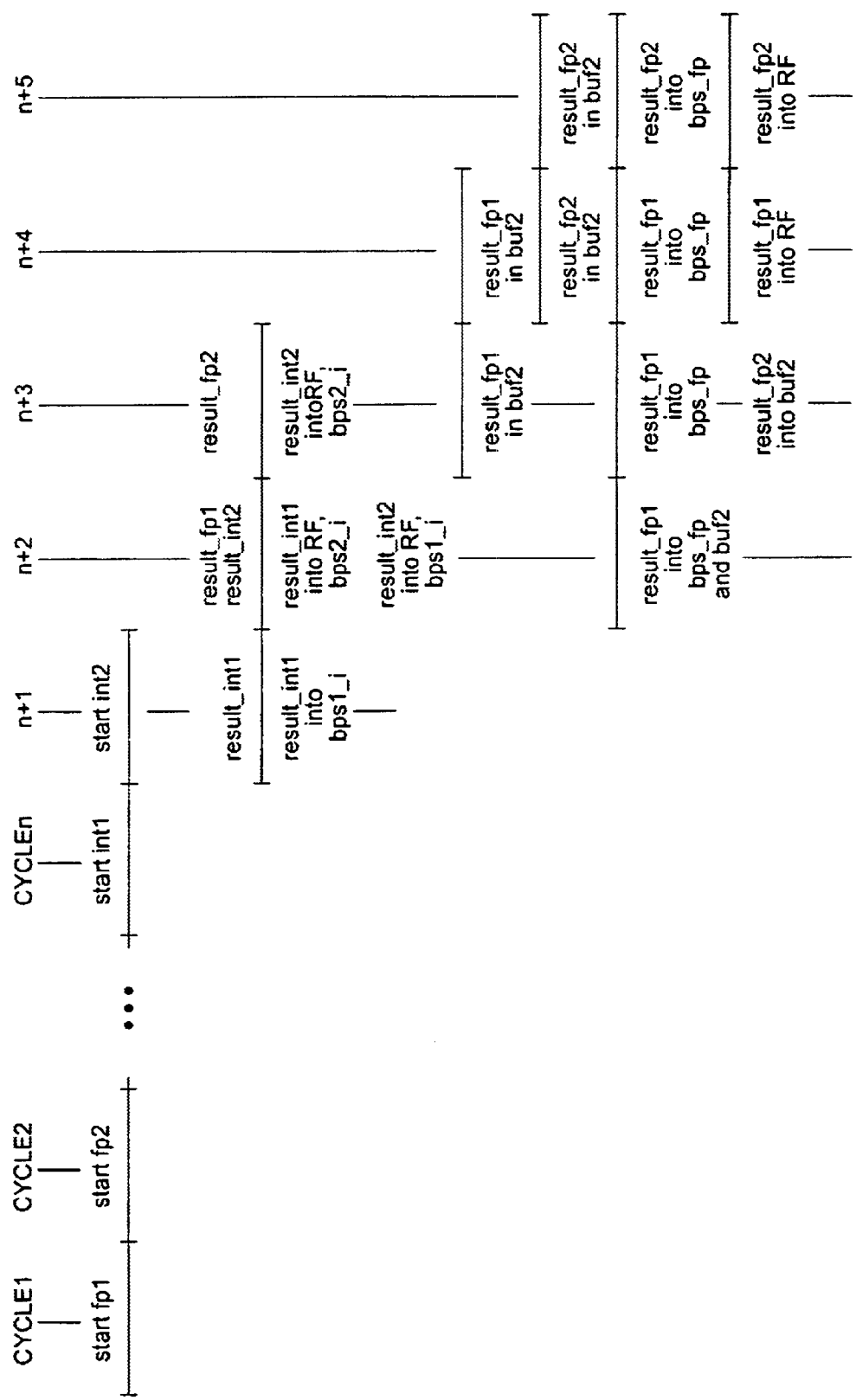
FIG. 4 is a timing diagram illustrating the occurrence of an output conflict to the register file.

Refer now to FIGS. 4 and 5A–5F. The timing diagram of FIG. 4 illustrates the execution timing (cycle 1–cycle n+5) when both a floating point operation and an integer operation are delivered to an ALC. FIGS. 5A–5F are flow diagrams showing the flow of data through an ALC during the execution sequence of FIG. 4.

Figure 5A:
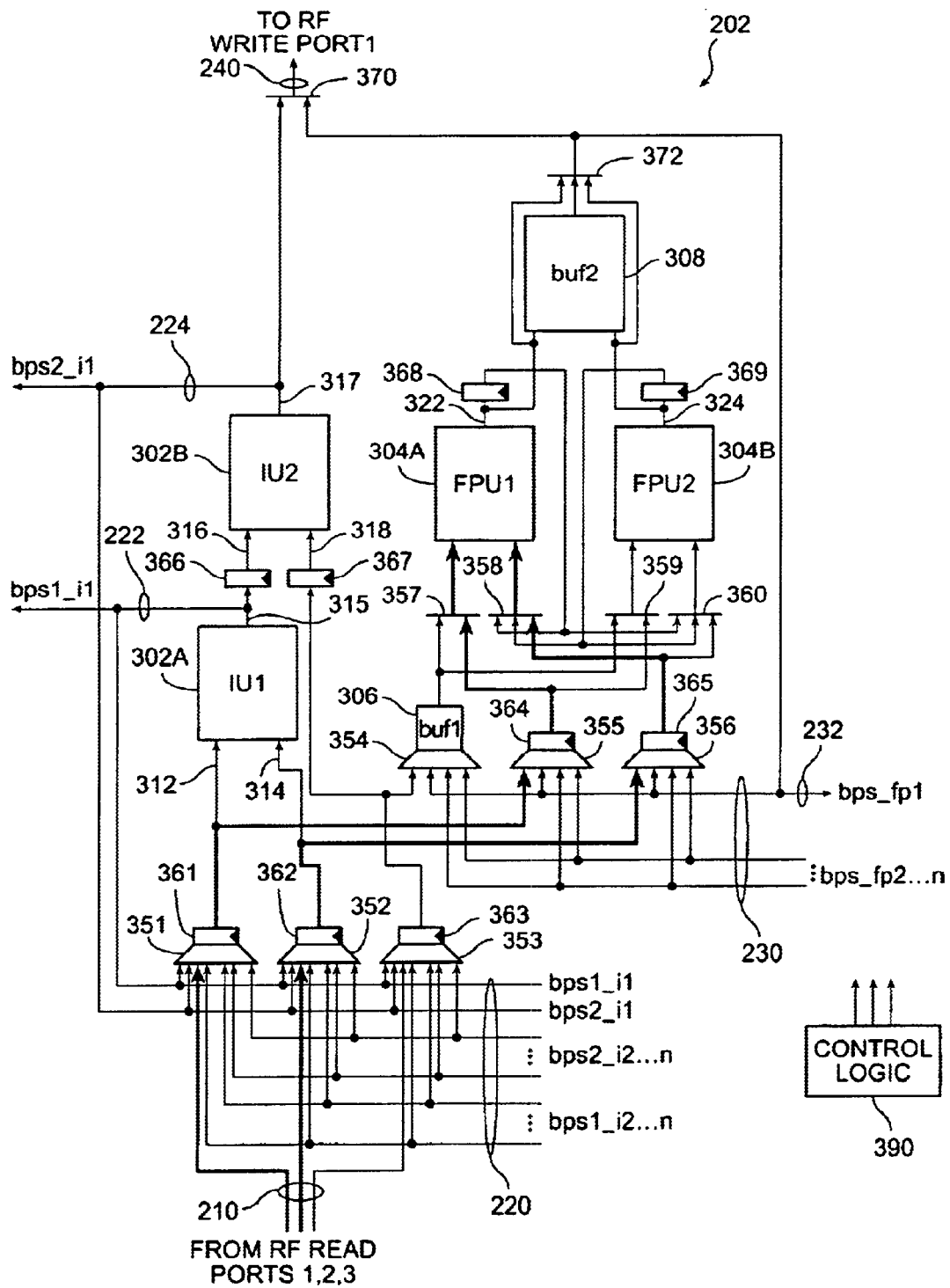
FIGS. 5A–5F illustrate data flows in the arithmetic logic channel corresponding to the timing diagram of FIG. 4.

FIG. 5A shows the data flow in bolded lines for the first clock cycle, cycle 1. A first two-operand floating point operation (fp1) is delivered to the ALC. Each operand is fed into the ALC from the read ports 210 of register file 132. A first operand is fed into mux 351 and latched into register 361. Similarly, a second operand is fed into mux 352 and latched into register 362. Mux 355 selects its leftmost input to deliver the first operand in register 361 to selector 357. Mux 355 then delivers it to an input of floating point computation unit 304A. At the same time, mux 356 selects its leftmost input to deliver the second operand from register 362 to selector 358, which then delivers it to another input of FP unit 304A.

FIG. 5A further shows the data flow for a second floating point operation (fp2), occurring at clock cycle 2. The floating point operation is issued to the same ALC. Note that the second floating point operation feeds into the same FP unit 304A. Recall that the floating point units 304A, 304B use a pipelined architecture. Hence, by cycle 2, the first floating point operation (fp1) has completed the first stage in the pipeline and is executing in the second stage. This condition allows the second floating point instruction (fp2) to begin executing in the first stage of FP 304A.

Figure 5B:
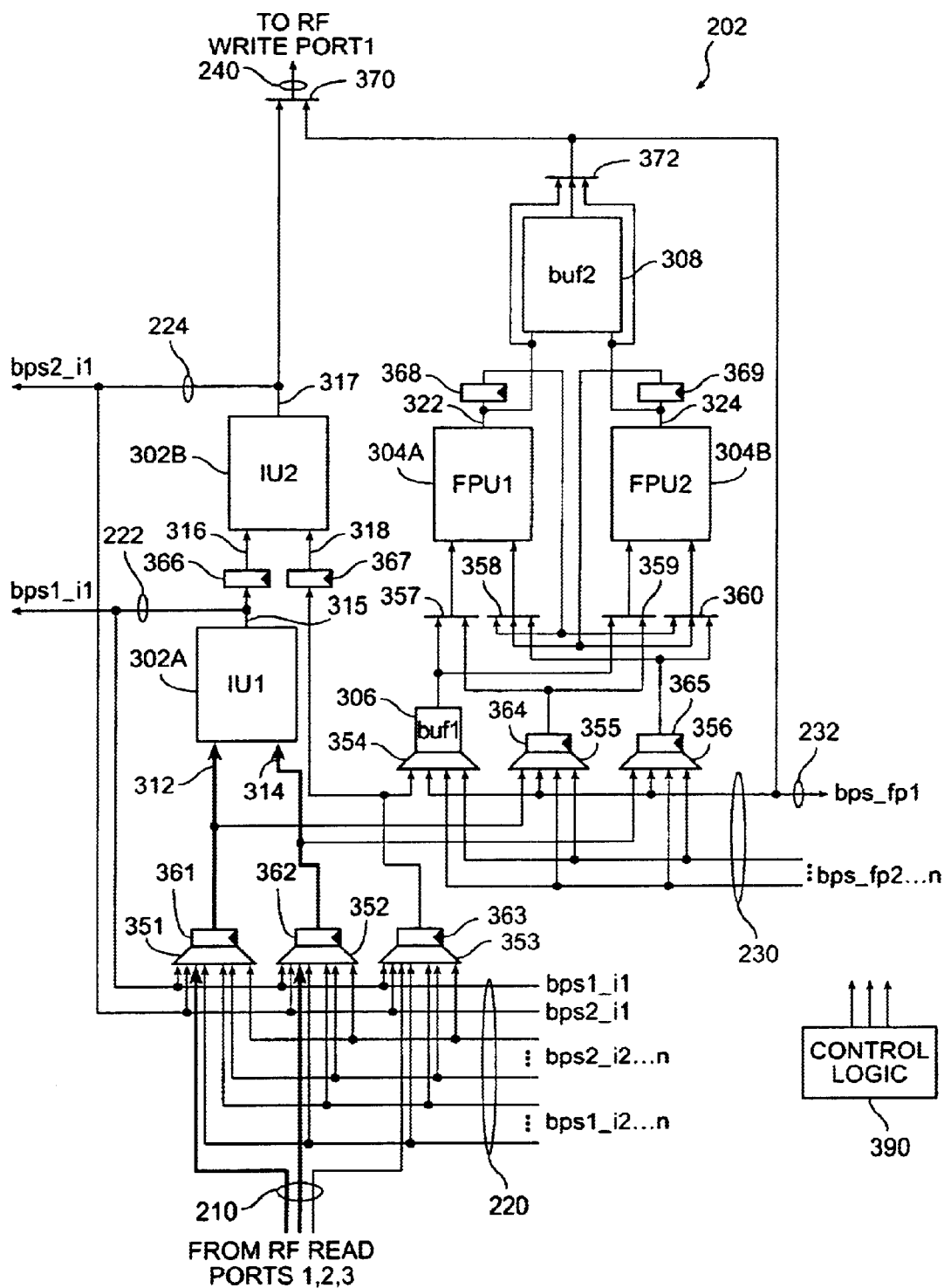

FIG. 5B shows the data flow some time later, at cycle n before fp1 and fp2 complete, a first two-operand integer operation (int1) is delivered to the ALC. Meanwhile, fp1 and fp2 are proceeding along in the FP pipeline. The operands of the integer instruction are delivered from the register file to mux's 351, 352, and fed into the inputs 312, 314 of integer computation unit 302A.

Figure 5C:
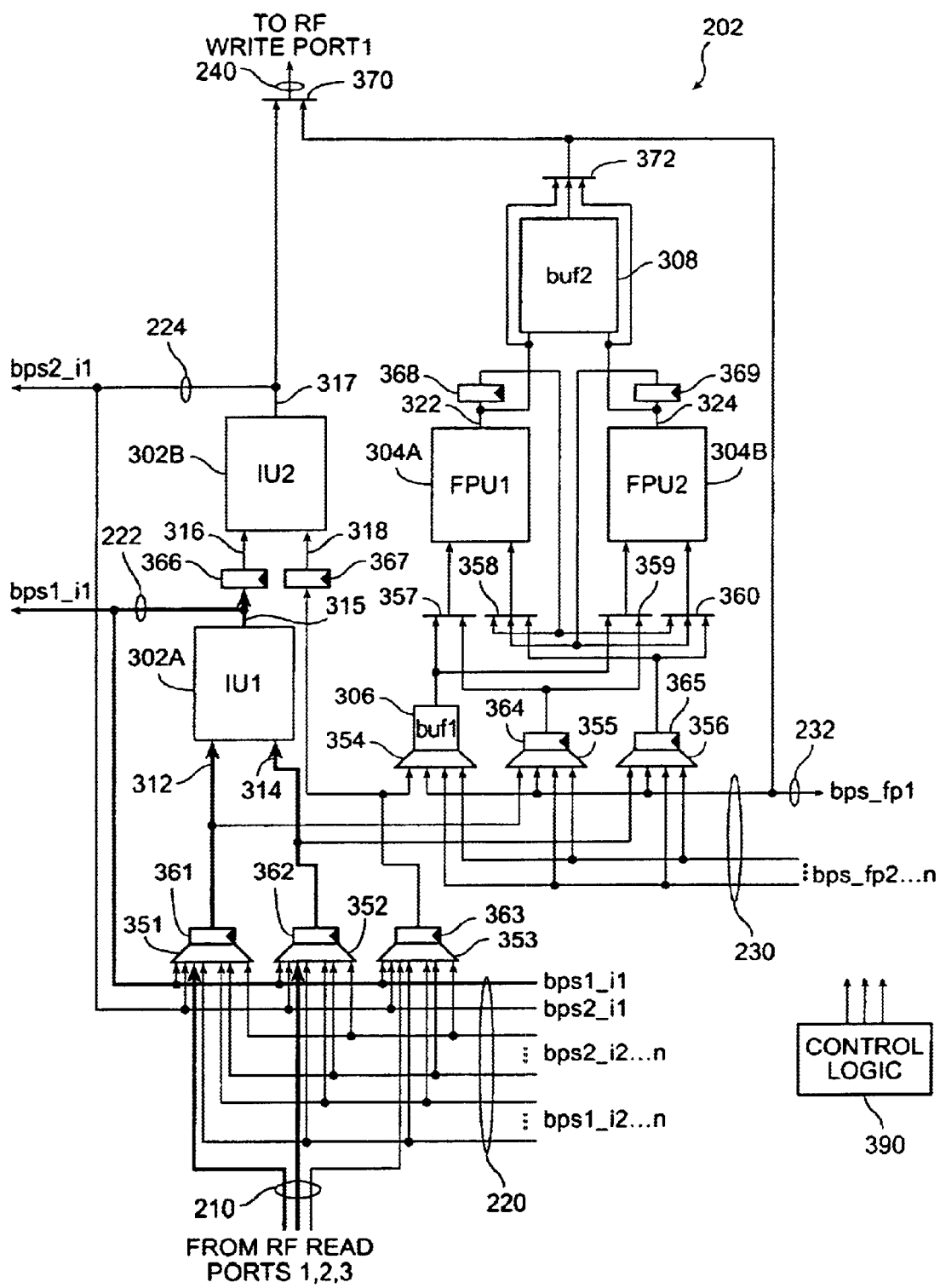

FIG. 5C shows the data flow at cycle n+1, where the result of int1 (result_int1) is ready at the output 315 of IU 302A. As will be discussed later, in the case of combined (three-operand) operations, result_int1 is passed upstream to integer floating unit 302B. However, integer instruction int1 is a two-operand instruction, and so result_int1 is made available to other ALC's by way of integer bypass bus 220. The result_int1 is also loaded and stored in register 366.

FIG. 5C further shows that in clock cycle n+1, another two-operand integer instruction (int2) is delivered. The data flow for execution of int2 is also shown in FIG. 5C. In the meanwhile, the floating point operations fp1 and fp2 continue down the floating point pipeline.

Figure 5D:
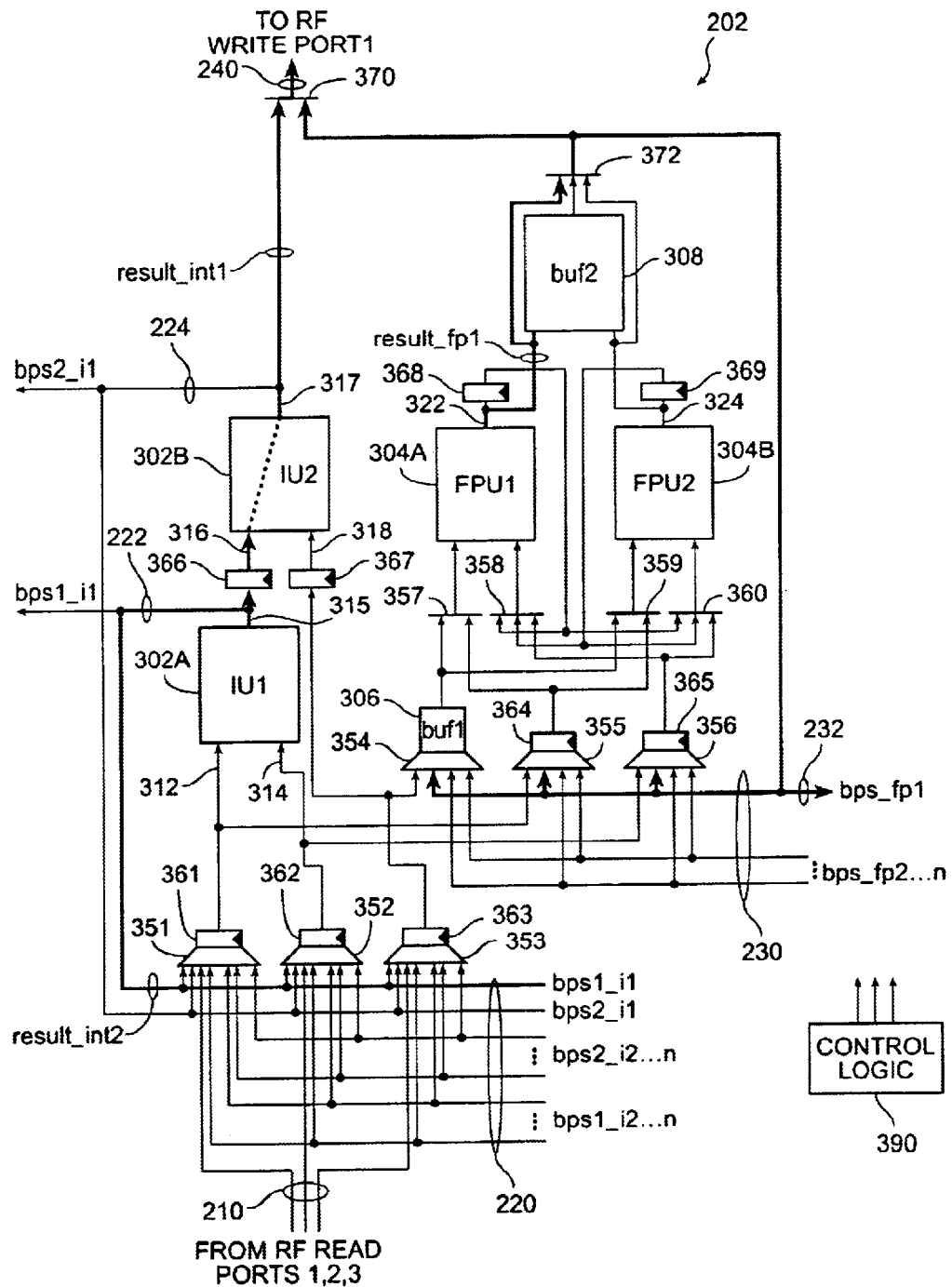

FIG. 5D shows the data flow at cycle n+2, when the result of fp1 (result_fp1) is available at the output 322 of FP 304A and is ready to be written out to the register file. At the same time, the result of integer instruction int1 is ready to be written out to the register file. This represents an output conflict, where both the result of an integer operation and the result of a floating point operation become available in the same clock cycle.

FIG. 5D shows how the conflict is resolved in accordance with the present invention. The control logic 390 detects the occurrence of the simultaneous availability of an integer result and a floating point result; i.e. the availability of results during the same clock cycle. By design, the control logic "knows" the latency of each operation by virtue of the decoding of instruction opcodes. The control logic tracks the execution stage of the computation units for each clock cycle, and can determine when any one operation is going to produce a result.

As can be seen in FIG. 5D, in response to the conflict condition, integer computation unit 302B is placed in a pass-through (transparency) mode. In this mode, the integer computation unit will simply pass its input directly to its output without processing. Pass-through mode is indicated by the dashed line in IU 302B. Thus, when register 366, containing result_int1, is clocked, its contents are output through IU 302B directly to selector 370.

At the same time, control logic 390 issues control signals to deliver the output of FP 304A into buffer memory 308. Selector 372 delivers the output 322 of FP 304A to selector 370. However, selector 370 selects its left input to deliver result_int1 to write port 240 of the register file. Thus, in accordance with one embodiment of the invention integer results are given higher priority in the case of output conflicts with floating point results. As can be seen further in FIG. 5D, though selector 370 does not deliver the floating point result to the register file, the result_fp1 is nonetheless delivered to floating point bypass bus 230 and thus becomes available to other ALC's.

This advantageous aspect of the present invention warrants further elaboration. The floating point result (result_fp1) has not yet been written into the register file at this time, being stored in buffer memory 308. However, result_fp1 is made available to other ALC's by way of the floating point bypass bus 230. More than that, result_fp1 is immediately available in the next cycle, because the bypass bus provides access to the result without having to access it from the register file.

Continuing, FIG. 5D also shows the result (result_int2) of integer instruction int2 being produced at the output of IU 302A. As with result_int1, the result of the second integer instruction, being a two-operand instruction is fed to the integer bypass bus 220 for other ALC's. The result is also latched and stored in register 366.

Figure 5E:
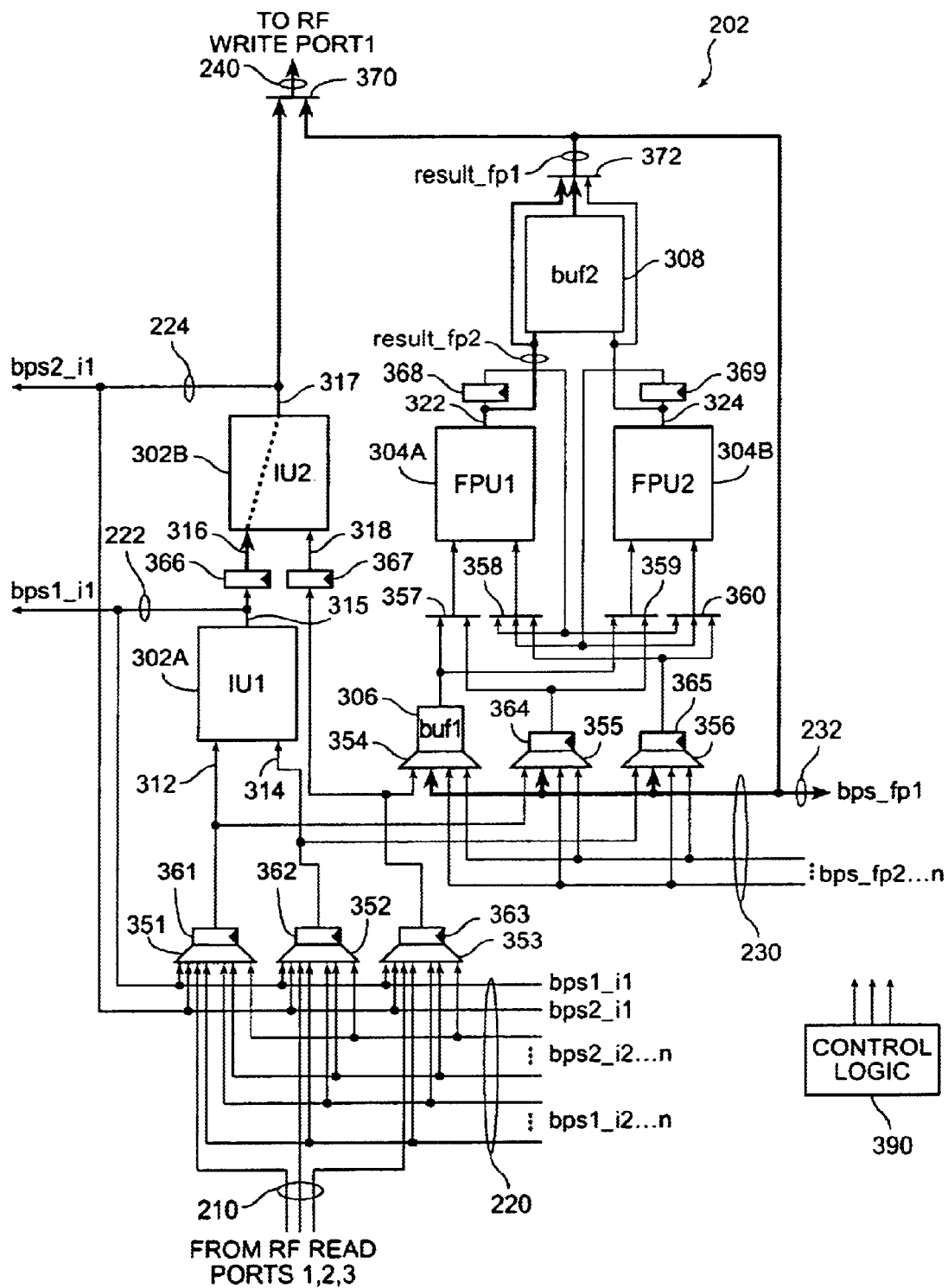

FIG. 5E shows the data flow at cycle n+3, when floating point instruction fp2 completes and produces result_fp2 which is ready to be written to the register file. At the same time result_int2 is ready to be written to the register file. In this case, both of the floating point results are waiting to be written to the register file. This is yet another occurrence of an output conflict. Again, the control logic 390 in accordance with the invention gives the integer result higher priority access to the register file. Hence, as shown in FIG. 5E, IU 302B is once again put in a pass-through or transparency mode so that when register 366 is clocked result_int2 passes immediately to selector 370 for delivery to write port 240 of the register file.

As can be seen in FIG. 5E, the result_fp2 feeds into buffer memory 308 and to selector 372. However, since result_fp1 has not yet been written to the register file, it is available in the buffer memory. Buffer memory 308 delivers result_fp1 to selector 372. Selector 372 then outputs result_fp1 to the floating point bypass bus 230.

Again, the advantage of the present invention is worth noting. Here, the floating point result of the first instruction still has not been written to the register file by virtue of the second integer result having higher priority. Hence, result_fp1 remains queued up in buffer 308. The result, however, is immediately available to the other ALC's by virtue of the bypass buss 230. Any ALC which needs result_fp1 does not have to wait for the result to be written to the register file, rather that ALC can perform floating point operations using result_fp1 on the very next cycle.

As a further observation, it can be seen that multiple floating point results can be queued up in buffer memory 308. Therefore, the buffer memory must have a queue depth equal to the maximum number of floating point operations which can be executing in the ALC.

Figure 5F:
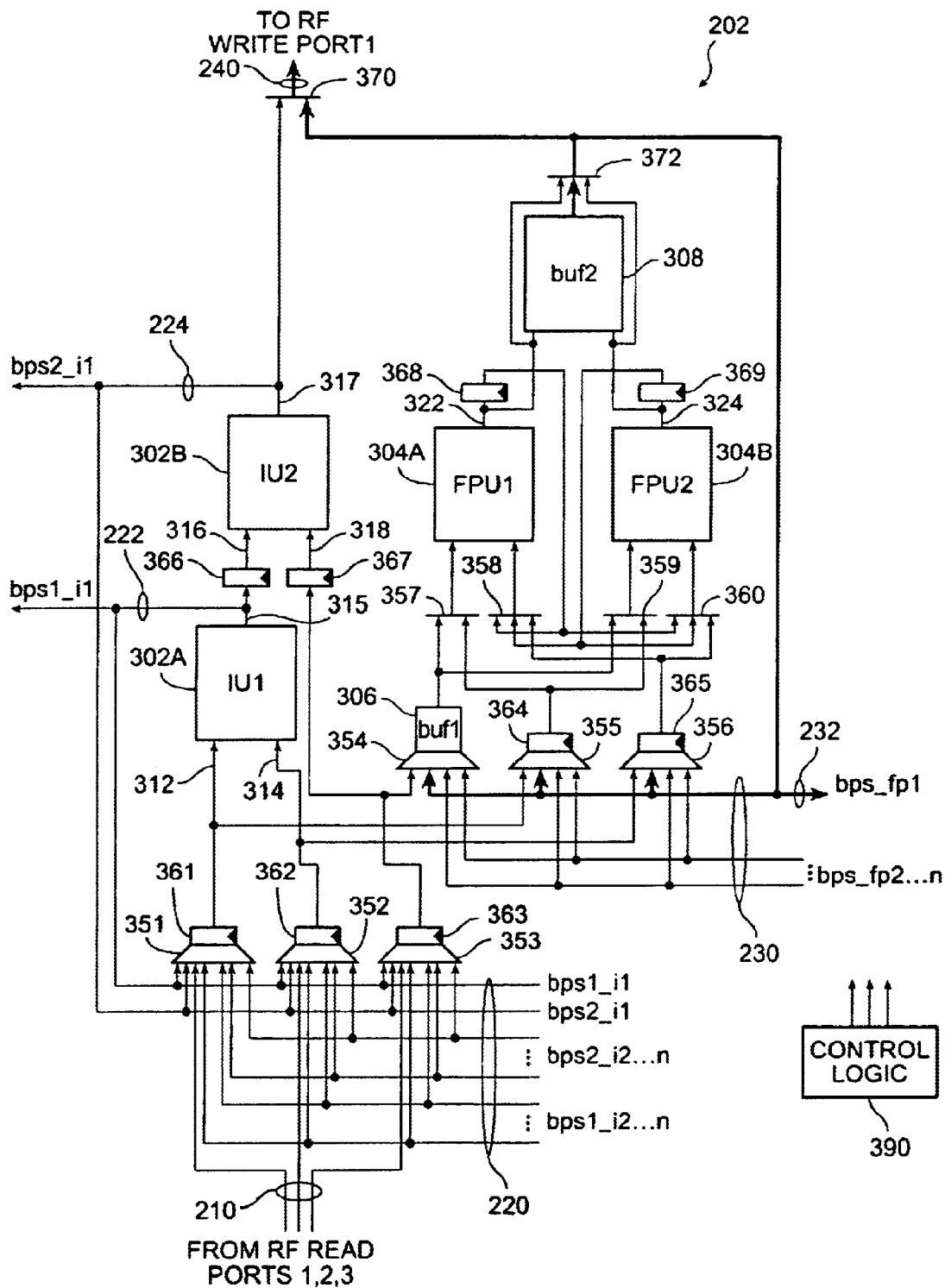

FIG. 5F shows that at cycle n+4, the integer results have been written to the register file. Thus, the floating point results can now be written. Consequently, control logic 390 signals buffer memory 308 to output result_fp1 to selector 372, which then delivers the datum to selector 370. Selector 370 then delivers the datum to write port 240. Incidentally, result_fp1 is also available on floating point bypass bus 230 at this time, while result_fp2 is still waiting in buffer memory 308.

Finally, FIG. 5F further represents that at cycle n+5, result_fp2 is delivered from buffer memory 308 to the register file. At this time, result_fp2 now becomes available to other ALC's via the floating point bypass bus.

Figure 6A:
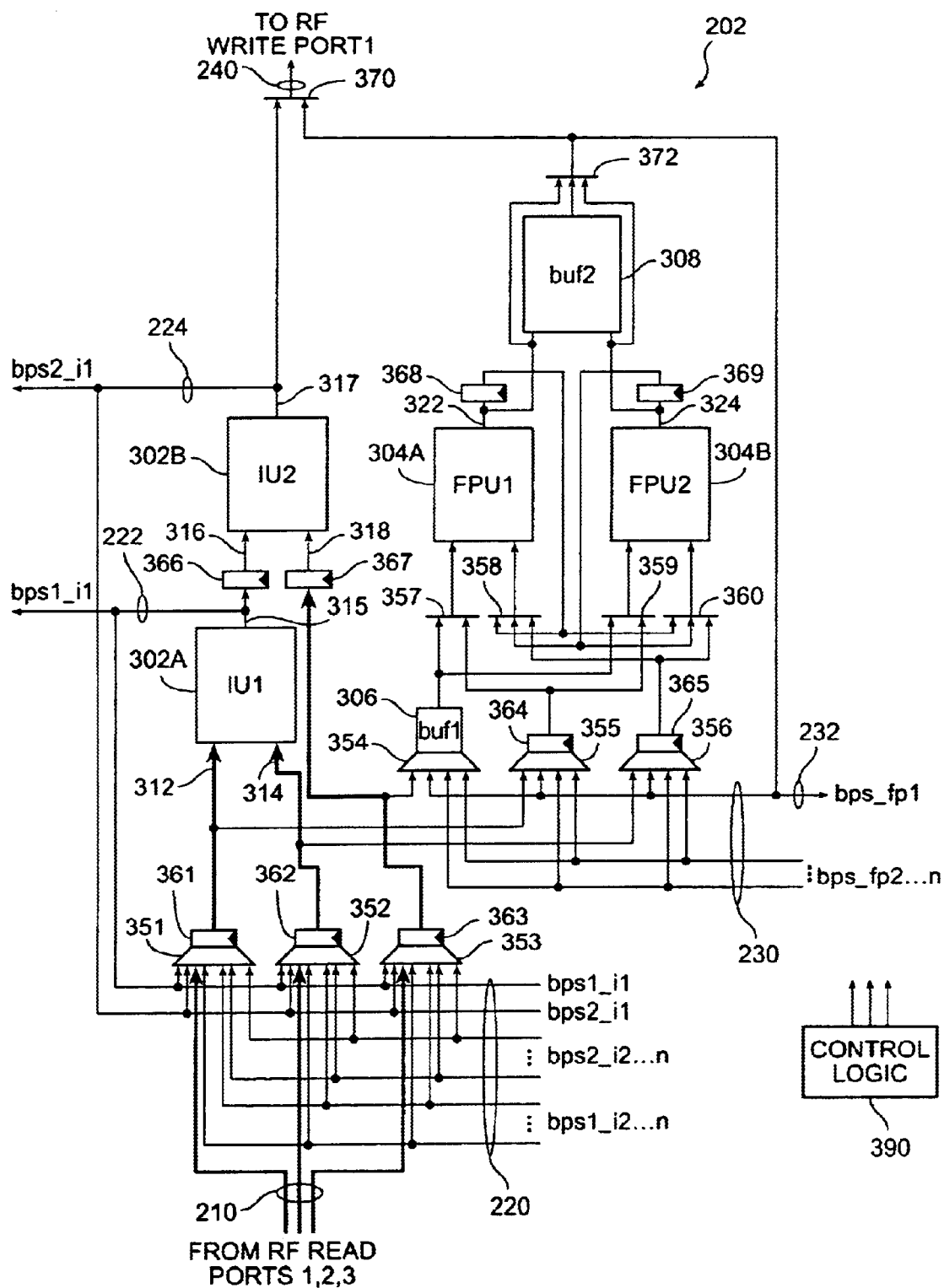
FIGS. 6A–6C illustrate data flows in the arithmetic logic channel for a integer combined instruction.
Figure 6B:
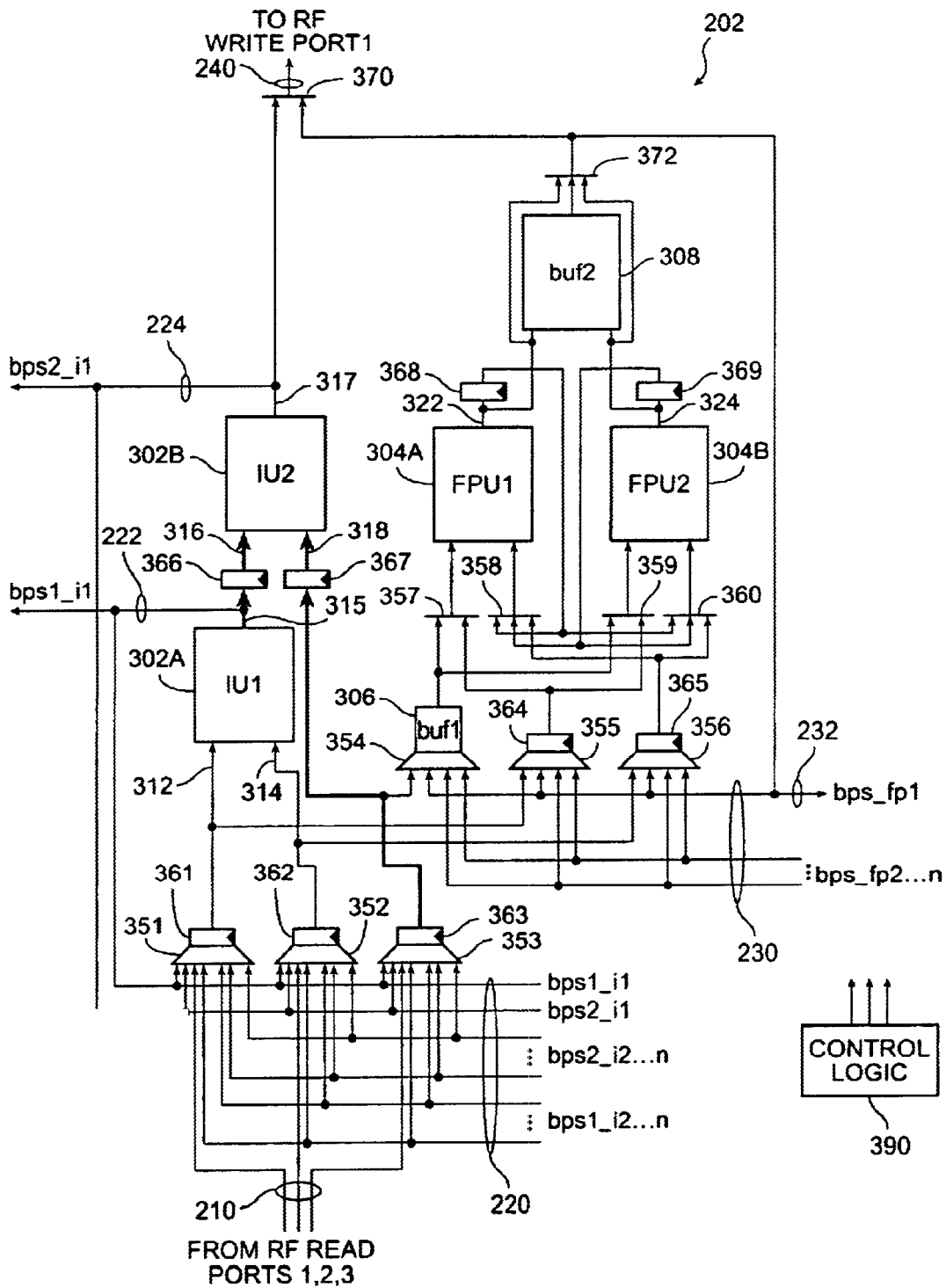
Figure 6C:
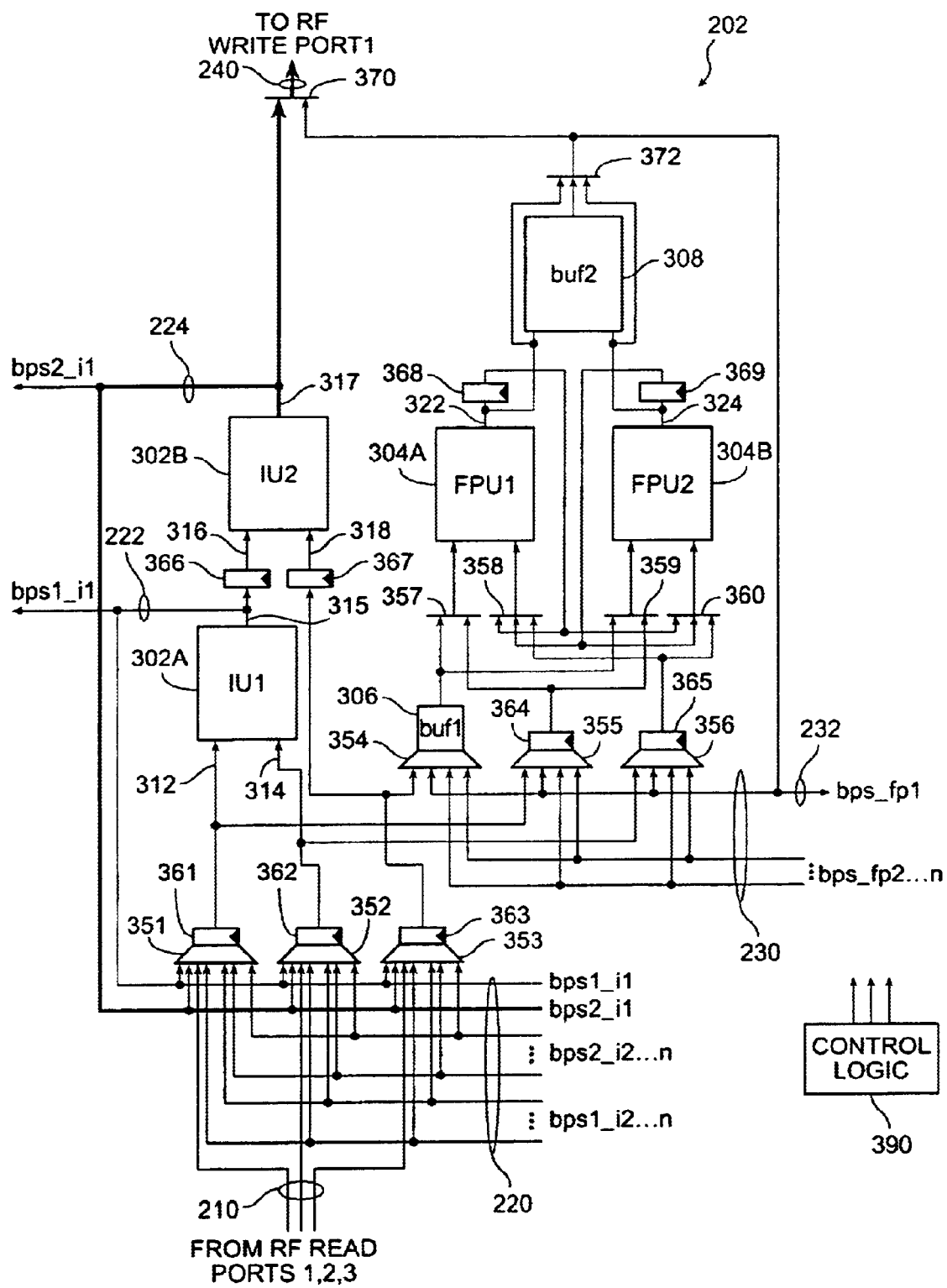

Refer now to the data flow diagrams of FIGS. 6A–6C, for a discussion of the flow sequence for an integer three-operand (combined) instruction. FIG. 6A shows the read ports 210 delivering the three operands to the ALC from the register file. As can be seen in FIG. 2, the bypass buses 220, 230 allow for other ALC's to be sources of operands, both for integer operations and for floating point operations. The delivered operands are latched into registers 361–363 via mux's 351–353. Two of the operands are then clocked into inputs 312, 314 of integer computation unit 302A. The third operand is clocked into register 367.

FIG. 6B illustrates that in the next cycle, an integer result is produced at output 315 of IU 302A and latched into register 366. The third operand is stored in register 367. Both registers 366, 367 are clocked into inputs 316, 318 of integer computation unit 302B. Note that integer bypass bus 220 does not carry the output of IU 302A. For integer combined operations, the intermediate value produced by IU 302A is not fed into the other ALC's. This is achieved by appropriate control signaling so that the other ALC's do not input data from the integer bypass line 222 of this ALC.

Continuing to FIG. 6C, IU 302B produces the final result at output 317. The output is delivered to integer bypass bus 220 via bypass line 224. The result also feeds into selector 370 which then delivers it to the register file via write port 240.

Figure 7A:
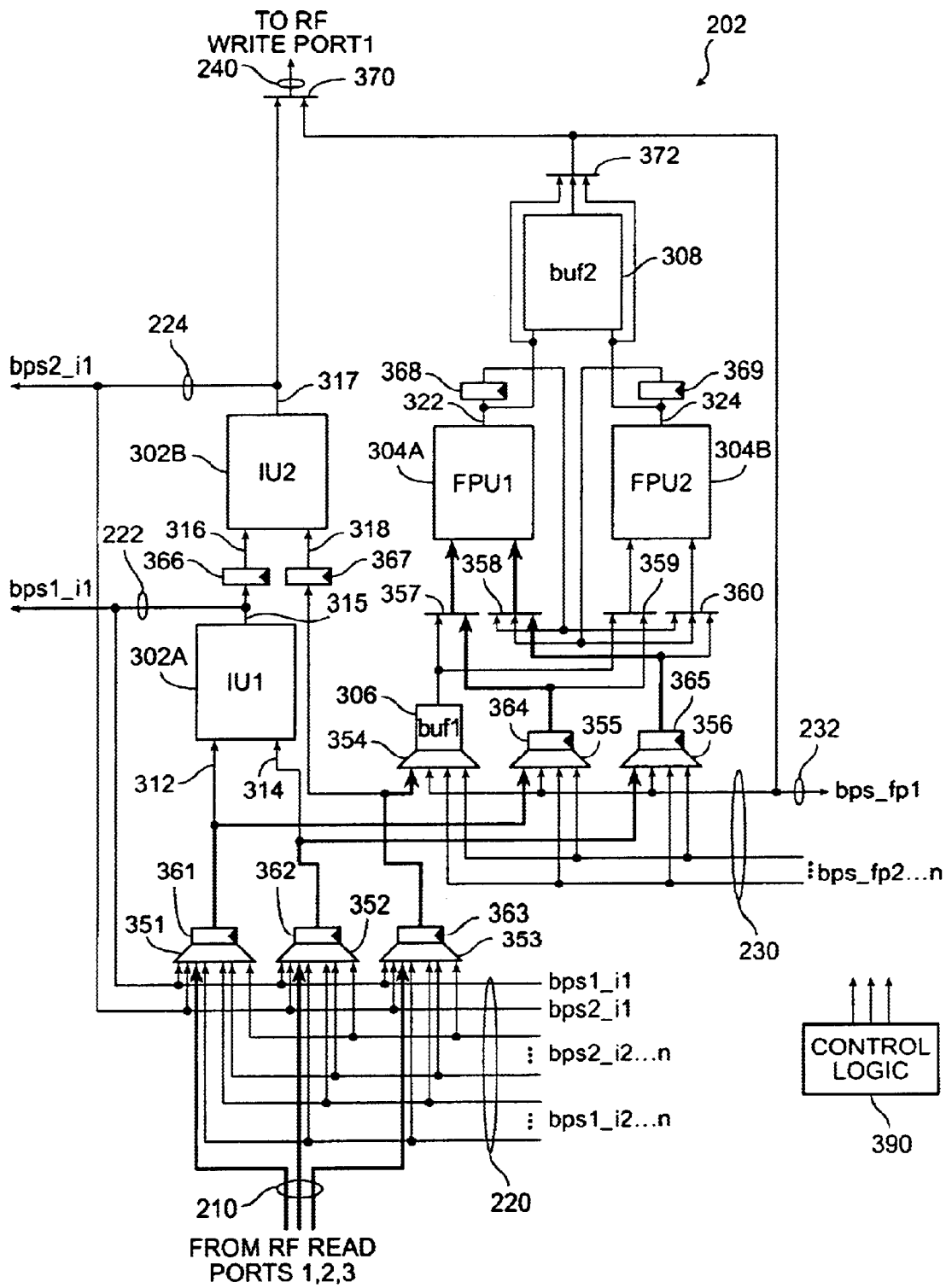
FIGS. 7A–7C illustrate data flows in the arithmetic logic channel for a floating point combined instruction.
Figure 7B:
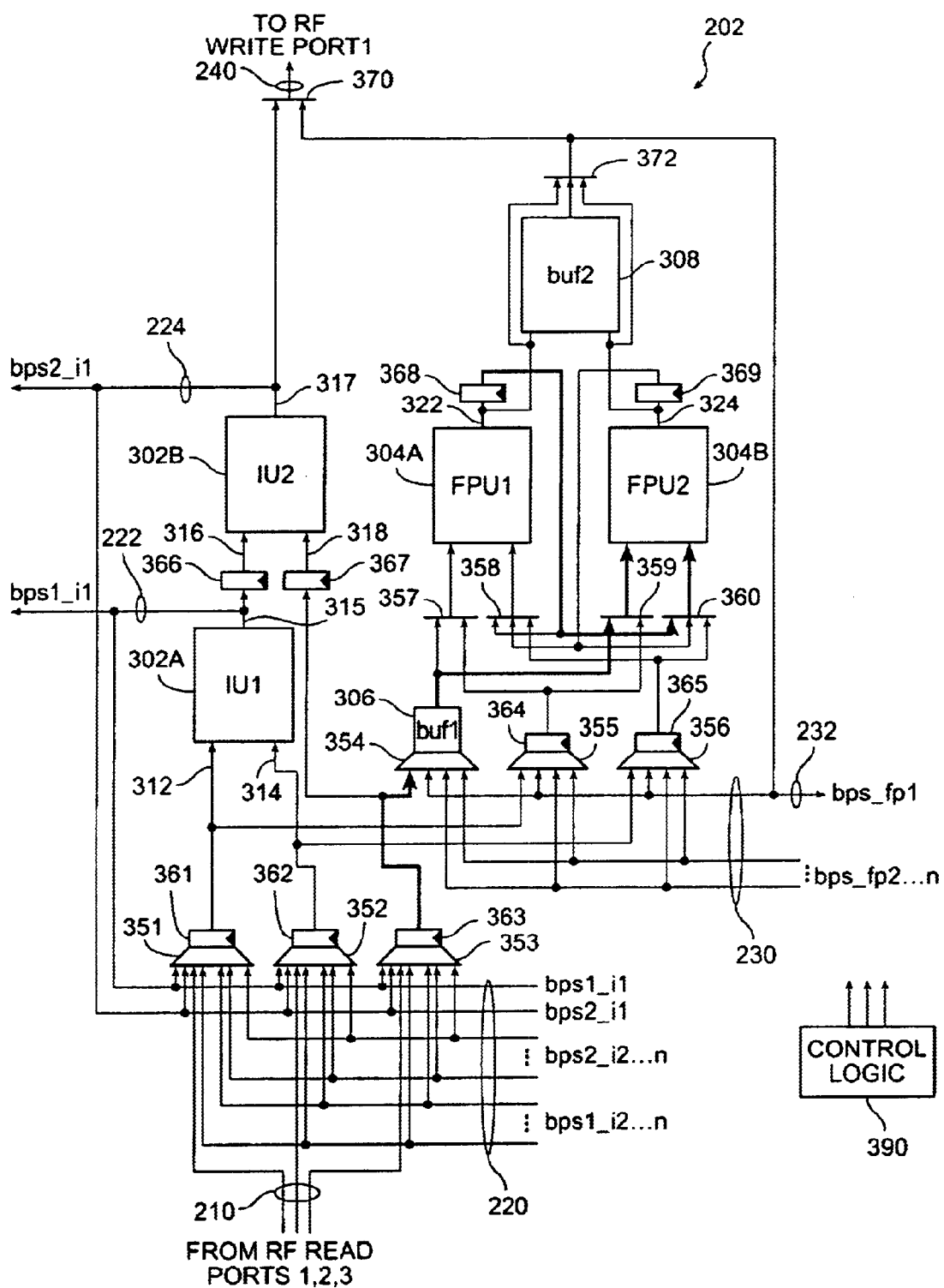
Figure 7B:
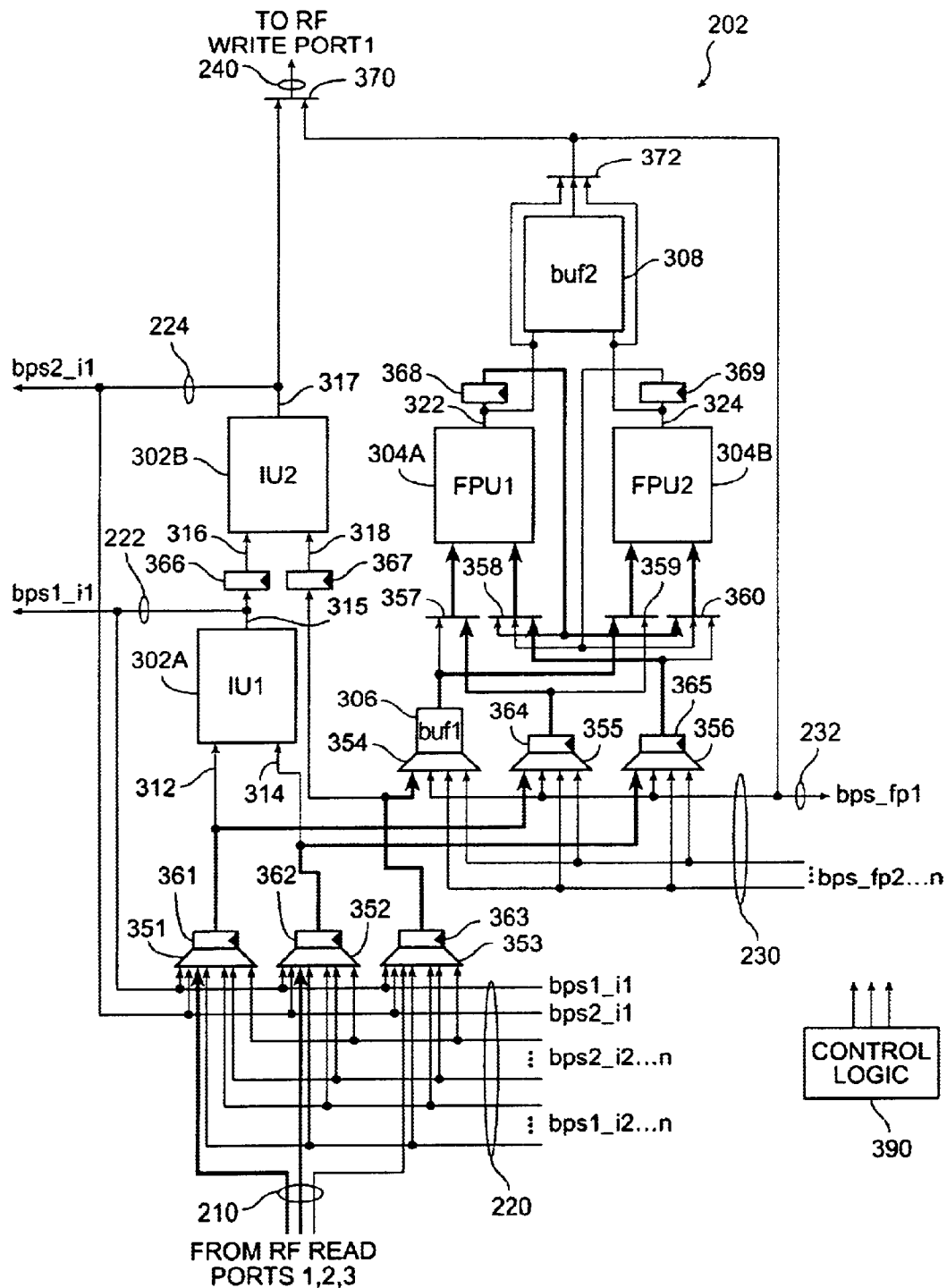
Figure 7C:
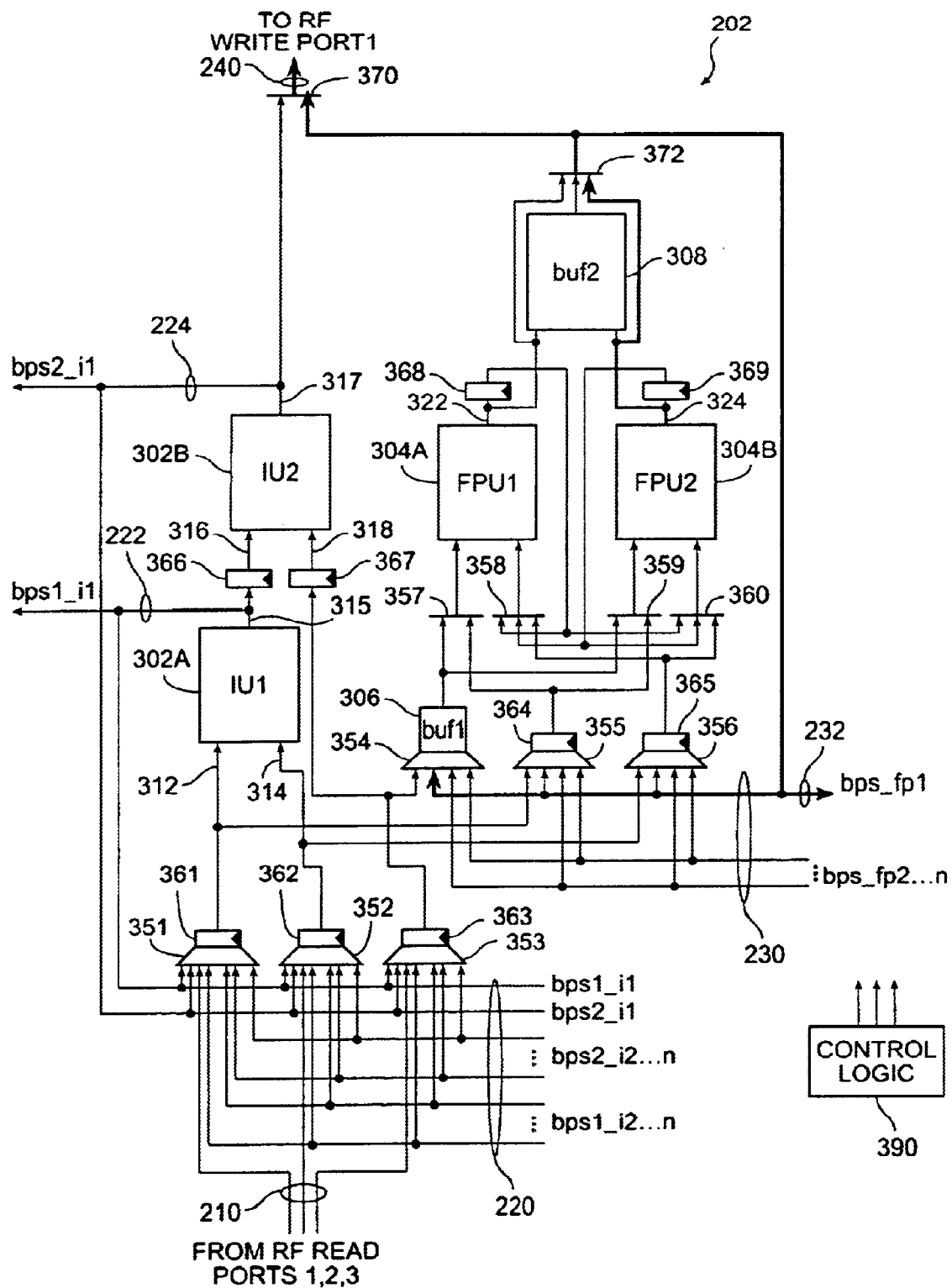

Referring now to FIGS. 7A–7C, the data flow for a floating point combined operation will be discussed. FIG. 7A shows that read port 210 carries the three floating point data for the operation. The data are latched into registers 361–363 via mux's 351–353. The data is then clocked out of the registers. Two of the operands are latched into registers 364, 365 via mux's 355, 356. These operands are then clocked to selectors 357, 358 and delivered to the inputs of floating point unit 304A. The third operand is fed into buffer memory 306.

Referring now to FIG. 7B, during subsequent cycles the floating point computation in FP 304A proceeds down the pipeline. Eventually, a result is produced at output 322. The result is latched into register 368 and then delivered to selector 360. At the same time buffer memory 306 delivers the third floating point operand to selector 359. The selectors 359, 360 then deliver the data into floating point computation unit 304B.

Refer to FIG. 7B' for a moment. By providing the second floating point computation unit 304B, a second, independent floating point operation can be delivered to the ALC. FIG. 7B' shows the additional data flow produced by the delivery of a second floating point instruction to the ALC. The operands feed into mux's 351, 352, into registers 361, 362, into mux's 355, 356, through registers 364, 365, and into selectors 357, 358. There the operands feed into FP 304A. Thus, both floating point computation units can execute independent floating point operations in a parallel manner. Moreover, the pipelined architecture of the floating point units permits execution of multiple parallel floating point instructions.

Note that the second floating point operation can be a floating point combined operation. In that case, the third operand is simply queued up in buffer memory 306 along with the third operand from the first floating point combined operation. The depth of the buffer memory therefore must be equal to the number of stages in the floating point pipeline.

Returning to FIG. 7B and continuing, FIG. 7C shows the completion of the floating point operation. The result is produced at output 324 of FP 304B and fed to selector 372. The selector then delivers the result to selector 370 for output to the register file. The result is also available on floating point bypass bus 230 via floating point bypass line 232. Note that the scenario of FIGS. 7A–7C does not include an output conflict with an integer result. Therefore, the result of the floating point operation is immediately written to the register file. The result does not need to be queued up in buffer memory 308.

With reference now to FIGS. 2 and 3, the bypass buses 220 and 230 allow the ALC's $202_x$ to perform operations which span multiple ALC's without losing a clock cycle as would occur in conventional architectures. Consider, for example, the following sequence of integer instructions:

$R_1$ op$_1$ $R_2 \rightarrow R_3$
$R_3$ op$_2$ $R_3 \rightarrow R_4$
$R_3$ op$_3$ $R_3 \rightarrow R_3$ During a first clock cycle, a first ALC is selected to execute op$_1$. The operands are obtained from $R_1$ and $R_2$. As previously discussed in connection with FIGS. 6A–6C, the integer instruction (op$_1$) will complete by the second cycle to produce a first intermediate result. The result is delivered to the integer bypass bus 220, whereupon during the second clock cycle a "second" ALC picks up the result. Note that bypass bus 220 obviates the need to store the result of op$_1$ into $R_3$. This is advantageous since in op$_3$ $R_3$ will be overwritten, so writing the result of op$_1$ would be wasteful.

To process the second instruction op$_2$, the second ALC picks up the first intermediate result from bypass bus 220 and latches it into registers 361, 362 via mux's 351, 352. The first intermediate result is then delivered from registers 361, 362 to both inputs 312, 314 of integer computation unit 302A. The second instruction completes by the third cycle to produce a second intermediate result. This intermediate result is then delivered to the integer bypass bus 220, where it is picked up by a "third" ALC. Note that the second ALC can in fact be the same as the second ALC, since the bypass bus is available to all ALC's. Incidentally, this intermediate result is written out to the register file to be stored in $R_4$.

To process the third instruction op$_3$, the third ALC picks up the second intermediate result from the first ALC via the bypass bus and latches it into its registers 361, 362 by way of mux's 351, 352. The second intermediate result is then delivered to inputs 312, 314 of IU 302A. The result of op$_3$ is executed in the fourth clock cycle to produce a fourth result.

During the fourth clock cycle, the final result is latched into register 366. IU 302B is put into a pass through mode so that when register 366 is clocked, its contents are passed directly to selector 370. Selector 370 is then operated to deliver the final result into $R_3$ of the register file through write port 240.

Note that the first intermediate result is not written to $R_3$ in the register file. Rather, it is delivered via the integer bypass bus 220 directly to another ALC for subsequent processing by op$_2$ and op$_3$ during subsequent clock cycles. The bypass mechanism saves many clock cycles by feeding intermediate results directly to the next ALC, rather than loading the result into the register file only to be immediately unloaded from the register file. A similar savings is realized for floating point operations.

What is claimed is:

1. A processing device comprising:
    an instruction execution unit having a plurality of arithmetic and logic channels (ALC's); and
    a register file in data communication with said instruction execution unit and having plural read terminals and plural write terminals,
    each ALC being coupled to read and write terminals of said register file different from those of other ALC's,
    each ALC comprising:
        an ALC output terminal coupled to one of said write terminals;
        a first computation unit having first input terminals and first output terminals, said first computation unit comprising a first pipelined floating point unit and a second pipelined floating point unit;
        a second computation unit having second input terminals and a second output terminal, said second computation unit comprising a first integer unit;
        input selector circuitry. coupled to said read terminals and configured to selectively deliver data from said register file to said first input terminals and to said second input terminals;
        output selector circuitry coupled to said ALC output terminal and configured to selectively couple said first output terminals and said second output terminal to said ALC output terminal; and
        control logic configured to detect an output conflict indicating that a floating point result and an integer result are both available for being output;
        said output selector circuitry comprising a buffer coupled to receive data only from said first output terminals, said buffer having a buffer output, said buffer having a depth equal to the number of floating point instructions that can be simultaneously executing in said first computation unit,
        said output selector circuitry responsive to said detection of said output conflict by:
            delivering data from one of said first output terminals to said buffer, if data is available thereat; and
            coupling said second output terminal to said ALC output, thereby delivering an integer result to said ALC output terminal,
        for each clock cycle, said input selector circuitry operable to accept data for an instruction and said output selector circuitry operable to selectively couple said first output terminals, said buffer output, and said second output terminal to said ALC output terminal,
    wherein execution times of said floating point units and said first integer unit are not equal.

2. The processing device of claim 1 further including a first bypass bus in data communication with said first output terminals of each of said ALC's and a second bypass bus in data communication with said second output terminal of each of said ALC's; said input selector circuitry further configured to selectively deliver data from said first and second bypass buses to said first and second input terminals of said ALC's; said output selector circuitry further configured to couple an output of said buffer to said first bypass bus.

3. The processing device of claim 1 wherein said second computation unit further comprises a second integer unit; said first integer unit having an output in data communication with an input of said second integer unit; said second integer unit having an output in data communication with said ALC output terminal; said outputs of said first and second integer units coupled to input selector circuitry of other ALC's; said input selector circuitry further configured to deliver data from said read terminals to inputs of said first integer unit and to another input of said second integer unit; whereby an ALC can begin execution of a two-operand or a three-operand integer instruction at every clock cycle.

4. The processing device of claim 1 wherein said first floating point unit and said second floating point unit, each has a floating point output coupled to said input selector circuitry; said input selector circuitry including a third-operand buffer; said input selector circuitry further configured to selectively deliver data from said read terminals, data from said third-operand buffer, and data from said floating point outputs to inputs of said first and second floating point units; whereby an ALC can begin execution of a two-operand or a three-operand floating point instruction at every clock cycle.

5. In a central processing unit having an instruction unit comprising plural arithmetic logic channels, each arithmetic logic channel (ALC) comprising:
  an ALC output;
  a first computation unit having first inputs and a first output;
  a second computation unit having second inputs and a second output;
  input selection circuitry configured to selectively couple externally provided data lines to said first inputs and to said second inputs;
  output selection circuitry configured to selectively couple said first and second outputs to said ALC output; and
  control logic configured to detect an output conflict wherein results produced by said first computation unit and by said second computation unit are available for output via said ALC output,
  said first and second computation units configured for parallel and independent execution,
  said output selection circuitry coupling said second output to said ALC output in response to detection of said output conflict,
  said output selection circuitry comprising a buffer, said output selection circuitry further configured to deliver data from said first output to said buffer upon detection of said output conflict,
  said first computation unit comprising a first floating point unit,
  said second computation unit comprising a first integer unit.

6. In a data processing unit, an arithmetic and logic channel (ALC) comprising:
  first means for performing floating point operations, including means for receiving three operands;
  second means for performing at least integer operations, including means for receiving three operands;
  an output port;
  means for detecting a conflict condition wherein a floating point result and an integer result are available for output;
  means for buffering said floating point result and for delivering said integer result to said output port in response to detecting said conflict condition; and
  means for delivering a floating point result from said buffer to said output port when there is no integer result ready to be output from said output port.

7. A method for operating an arithmetic and logic channel (ALC) comprising a floating point unit and an integer unit, each having a different execution time, said floating point unit and integer unit having common read ports from a register file and said ALC having a single output port, the method comprising steps of;
  processing floating point instructions to produce floating point results;
  processing integer instructions to produce integer results;
  delivering said integer results to said output port;
  detecting a conflict condition wherein a first floating point result and a first integer result are ready to be output at the same time, and in response thereto buffering said first floating point result in a buffer unique to said ALC and delivering said first integer result to said output port; and
  delivering floating point results from said buffer to said output port only when there are no integer results ready to be delivered to said output port,
  wherein an integer result is always delivered to said output port in preference over a floating point result when there is a conflict condition.

8. The method of claim 7 wherein said floating point results are buffered in said buffer, and further including delivering at least one of said floating point results to a bypass line; whereby a second ALC coupled to said bypass line can read said floating point results while they are buffered in said buffer.

9. The data processing unit of claim 6 wherein said means for performing at least integer computations comprises a first integer unit and a second integer unit in cascaded arrangement with said first integer unit.

10. The data processing unit of claim 9 wherein said means for performing floating point computations comprises a first floating point unit and a second floating point unit in cascaded arrangement with said first floating point unit.

11. In a data processing device, an instruction unit comprising:
  a first arithmetic and logic channel (ALC);
  at least a second ALC;
  an input bus in data communication with said first and second ALC's to provide input data thereto;
  each of said first and second ALC's comprising:
    input ports in data communication with said input data bus;
    an output port;
    first means for performing at least integer computations to produce integer results;
    second means for performing floating point computations to produce floating point results;
    third means for detecting a conflict indicative of an integer result and a floating point result both being ready to be coupled to said output port; and
    fourth means for selectively coupling said integer results and said floating point results to said output port, said fourth means including means for buffering said floating point result and for coupling said integer result to said output port upon detecting a conflict.

12. The data processing device of claim 11 wherein each of said first and second ALC's further comprises a floating point bypass bus in data communication with said input bus, wherein said fourth means further includes means for coupling said floating point result to said floating point bypass bus upon detecting said conflict.

* * * * *